INVENTOR.
DOUGLAS Q. McMASTERS

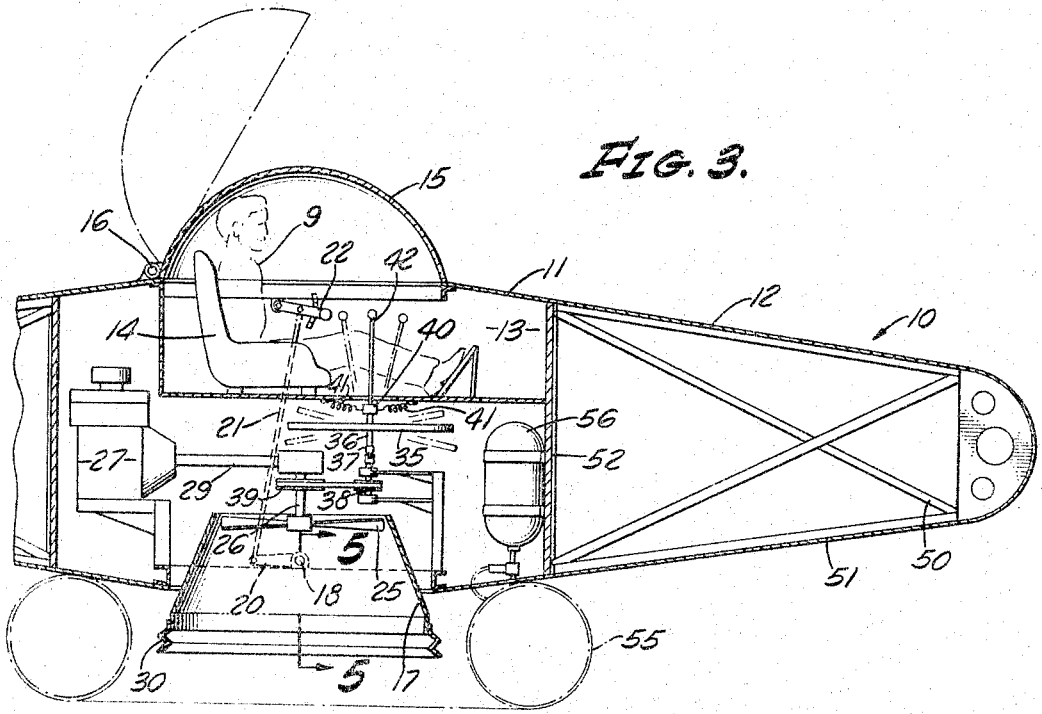
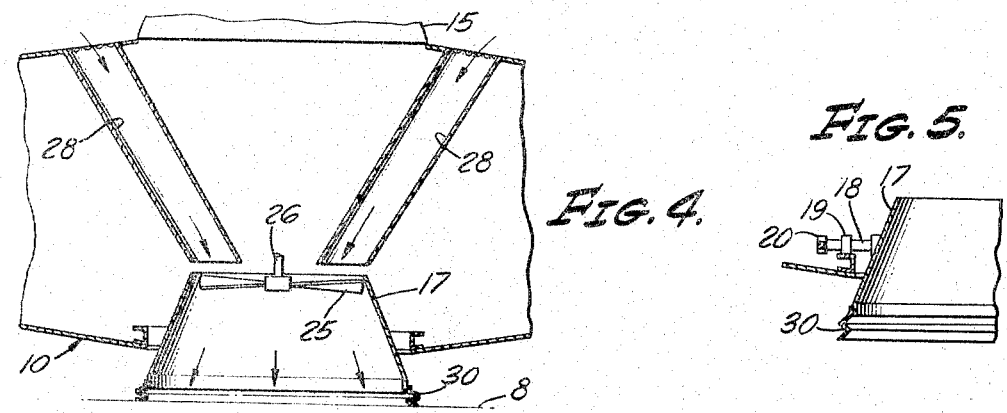
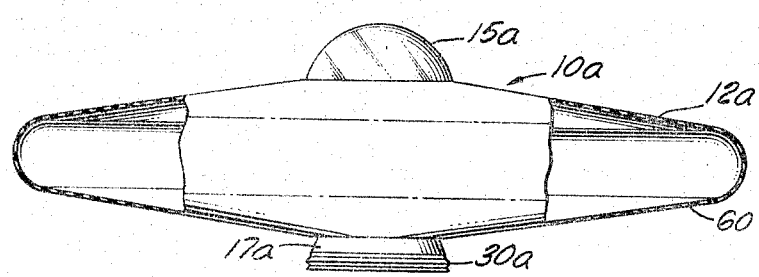

May 23, 1967 D. Q. McMASTERS 3,321,156
UNIVERSALLY MANEUVERABLE AIRCRAFT
Filed March 18, 1965 3 Sheets-Sheet 3

INVENTOR.
DOUGLAS Q. McMASTERS
BY
*Lyon & Lyon*
ATTORNEYS

United States Patent Office
3,321,156
Patented May 23, 1967

3,321,156
UNIVERSALLY MANEUVERABLE AIRCRAFT
Douglas Q. McMasters, 2594 2nd Ave.,
Muscoy, Calif.
Filed Mar. 18, 1965, Ser. No. 440,708
12 Claims. (Cl. 244—5)

This invention relates to an aircraft which is maneuverable in any desired direction and, in particular, is directed to an extremely lightweight aircraft requiring only a small horsepower engine to produce the necessary motive power.

Conventional aircraft employ aerodynamic surfaces which are moved through the air to produce the necessary lift force for retaining the craft aloft. These aerodynamic surfaces are comprised of the rotor blades in a helicopter or the wings of a conventional airplane. The lift force in a buoyant airship is provided by filling a cell of sufficient size with a lighter-than-air gas whereby no outside force need be applied for retaining the airship aloft.

It is a principal object of this invention to provide an aircraft wherein a significant proportion but less than all of the weight is counteracted by a lighter-than-air buoyant cell and the entire aircraft is shaped for producing an aerodynamic lift force as the craft is moved through the air.

Another object of this invention is to provide a semi-buoyant aircraft wherein a relatively small engine operating an air fan is capable of producing sufficient upward thrust to lift the resultant non-buoyant weight of the aircraft.

A further object of this invention is to provide a novel form of semi-buoyant aircraft of a circular symmetrical airfoil shape whereby tilting and moving the aircraft in any horizontal direction produces a resultant aerodynamic upward force to assist in retaining the aircraft aloft.

Still another object of this invention is to provide a novel form of semi-buoyant aircraft having an air fan for producing sufficient upward force to retain the aircraft aloft and a resultant horizontal force in any given direction toward which the craft is tilted.

Another object of this invention is to provide a novel form of aircraft which employes a movable rotating wheel to produce a gyroscopic effect and provide the sole means for tilting the aircraft in any desired direction for appropriately maneuvering the aircraft.

Still another object of this invention is to provide a novel form of aircraft which employs a downwardly facing air fan enclosed within a truncated cone for producing the necessary upward thrust to retain the craft airborne. A still further object is to provide such an arrangement wherein the lower periphery of such truncated cone includes an extensible and collapsible sealing means for engaging a ground surface whereby the cone is virtually sealed to the ground surface during the first upward movements of the aircraft.

A further object of this invention is to provide a relatively flat circular aircraft comprising a buoyant envelope surrounding a central compartment adapted to contain the motive power and the operator. A still further object is to provide such an aircraft wherein the buoyant envelope is completely flexible for absorbing the shocks incurred in a collision with another object. Still another alternate object of this invention is to provide such an aircraft wherein the encircling envelope rotates relative to the compartment for both stabilizing the flight of the airship and dissipating heat developed on the surfaces of the envelope.

Other and more detailed objects and advantages of this invention will appear from the following description and the accompanying drawings, wherein:

FIGURE 3 is a fragmentary sectional elevation view taken substantially on the line 3—3 in FIGURE 1.

FIGURE 4 is a fragmentary sectional elevation view taken substantially on the lines 4—4 shown in FIGURES 1 and 2.

FIGURE 5 is a fragmentary elevation view of the cone tilting mechanism taken substantially on the line 5—5 shown in FIGURE 3.

FIGURE 6 is a partial sectional elevation of a modified form of the airship of this invention which employs a completely flexible encircling envelope.

Figure 1:
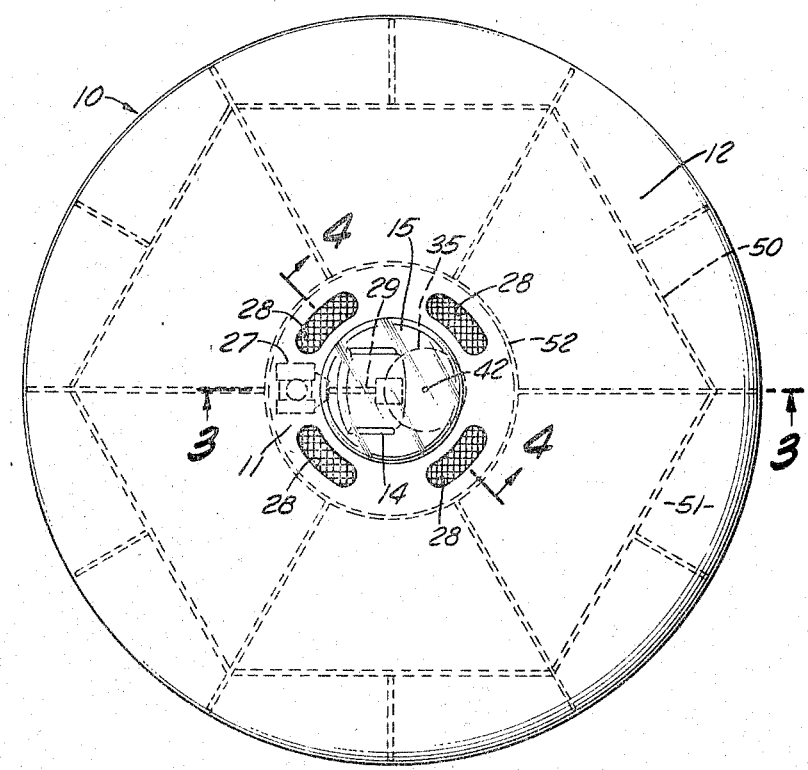
FIGURE 1 is a top plan view of the preferred form of the aircraft of this invention with certain internal structural members shown in dashed lines.
Figure 2:
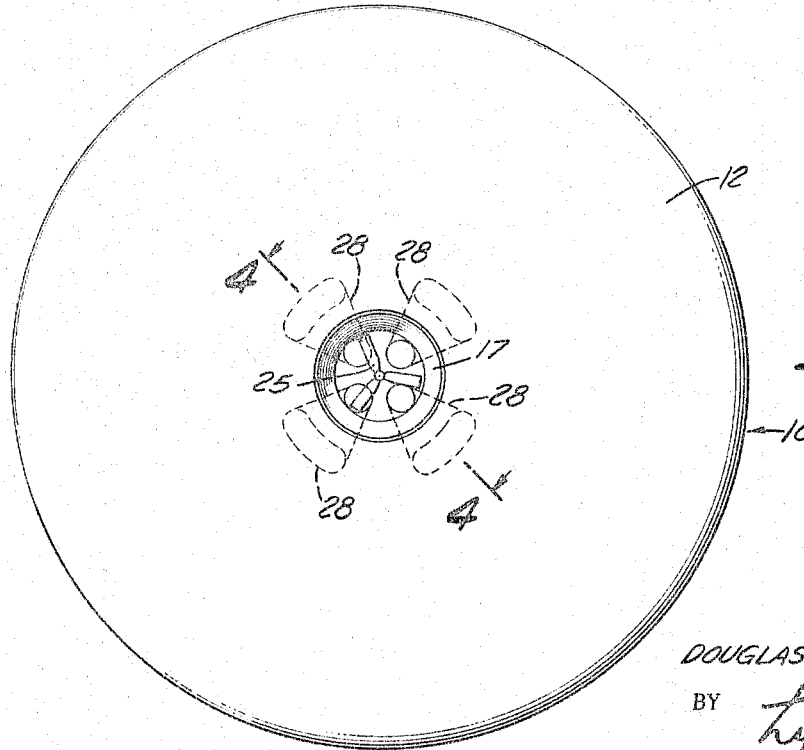
FIGURE 2 is a bottom plan view of the aircraft shown in FIGURE 1.

Referring now to FIGURES 1 through 5 the preferred form of aircraft, generally designated 10, is shown although it will be appreciated that many of the details of this preferred form may also be included in the other forms of the aircraft. The aircraft 10 includes a central frame or compartment 11 encircled by an annular envelope 12 although these two portions may be integral and continuous in the final assembly. The compartment 11 is of a lightweight construction and a generally cylindrical shape with its axis oriented in the vertical direction. The upper portion of compartment 11 includes the section 13 having a seat 14 adapted to accommodate the operator 9. A transparent canopy 15 encloses the section 13 and permits visibility of the operator 9 around the entire aircraft. The canopy 15 is hinged at 16 for opening thereof to permit ingress and egress of the operator 9.

In the lower portion of compartment 11 a truncated cone 17 is mounted with its larger end extending downwardly beyond the lower extremity of compartment 11. Cone 17 is pivotally mounted by diametrically positioned stub shafts 18 which extend outwardly from the cone and are rotatably supported in bearings 19. A crank arm 20 is connected to a stub shaft 18 on one side of the cone 17. A link rod 21 extends upwardly from crank arm 20 and is connected to a lever 22 accessible by the operator 9 for causing tilting of the cone 17 in response to changing the position of lever 22. The cone 17 is mounted on a pivotal axis which extends laterally relative to the normal direction in which the operator 9 faces whereby the cone 17 is tilted either forwardly or rearwardly relative to the operator. The tilting of cone 17 is relatively limited and is employed merely to assist in producing a resultant forward or rearward component of force on the aircraft to cause travel in the desired direction.

An air fan 25 is positioned within the upper extremity of cone 17 and depends from a rotatable shaft 26. An engine 27 is mounted in the compartment 11 and serves to rotate shaft 26 and fan 25 through an appropriate drive mechanism 29. Engine 27 may be of any desired type but it is specifically contemplated that an extremely lightweight engine of a high horsepower-to-weight ratio be employed to achieve the best operational characteristics. A plurality of passageways 28 extend downwardly from the upper extremity of compartment 11 to a location immediately adjacent the upper extremity of cone 17. In the illustrated embodiment four passageways 28 are employed and these are symmetrically spaced around the compartment 11. The fan 25 and driving engine 27 serve to draw air through the passageways 28 and discharge such air out the cone 17 to produce a resultant upward thrust on the aircraft 10. As the cone 17 is tilted in the afore-described manner, the major portion of the thrust force will still be in the upward direction to retain the aircraft aloft but a portion of the thrust force will be directed either forwardly or rearwardly to cause appropriate movement of the aircraft.

The lower periphery of cone 17 is provided with a downwardly extending annular member 30 which is extensible and collapsible relative to the cone. In the starting condition of the aircraft 10, the member 30 engages the ground surface 8 and forms a seal therewith as shown in FIGURE 4. As the fan 25 is rotated to urge the air downwardly the air pressure within cone 17 builds up and causes the reaction of lifting the aircraft 10. Since member 30 functions somewhat as an extensible gasket this pressure build-up within cone 17 is maintained over a short distance of upward movement of the aircraft thereby assisting in initially overcoming the inertia of the aircraft.

Means are provided for stabilizing and controlling the attitude of the aircraft 10 and as shown in the drawings, these means may include a wheel 35 mounted for rotation in a generally horizontal plane. A shaft 36 connects wheel 35 through a universal joint 37 to a drive shaft 38. Drive shaft 38 is rotated by any convenient means such as through a V-belt drive connected to shaft 26. Wheel 35 is of a sufficient weight and diameter and is rotated at a sufficient speed to produce a gyroscopic affect on the aircraft 10 whereby the attitude of the aircraft 10 is stabilized at any particular unchanging position of wheel 35. The upper end of shaft 36 is rotatably mounted in a bushing 40 which is in turn resiliently secured in a central position by plurality of tension springs 41 extending outwardly from the bushing. A handle 42 extends upwardly from the bushing and is accessible by the operator 9. By manually urging the handle 42 away from its vertical position, the plane of rotation of wheel 35 relative to the aircraft 10 is changed, thereby producing a resultant force and change of attitude of the aircraft.

The envelope portion 12 of the aircraft 10 comprises an outwardly extending frame or superstructure 50 covered by an imperforate skin 51. Superstructure 50 is of the lightest possible weight commensurate with providing the necessary strength to retain the shape of skin 51. The imperforate skin 51 together with the imperforate cylindrical wall 52 surrounding compartment 11 forms an inflatable compartment of the envelope 12. Envelope 12 may be filled with a lighter-than-air gas such as helium to produce a buoyant affect on the aircraft 10 in an amount less than the total weight of the aircraft. The periphery of envelope 12 is circular in the plan view and is bluntly rounded as shown in FIGURE 3. The envelope 12 is tapered toward the periphery to form a wedge-shaped profile of the aircraft 10. As is well known to those skilled in the aerodynamics art, this wedge-shape profile produces a resultant upward lift force on the aircraft 10 when the aircraft is moved through the air at a slight inclined attitude in the direction of movement. Thus the lifting force to sustain the aircraft 10 aloft is a product of both the upward thrust produced by the air fan 25 and the upward lift force produced by the movement of the aircraft through the air. By changing the attitude of the aircraft 10 through movement of handle 42, the aircraft may be turned in any direction. By appropriately tilting the cone 17, a resultant forward or rearward thrust may be imposed on the aircraft to initiate forward motion or bring the craft to rest, respectively. Since the fan 25 is not exposed to the passing atmosphere as the aircraft moves through the air, the problems of different relative rates of air speed of the rotors confront the opeartion of a helicopter are not involved with the operation of aircraft 10.

As an example of the relative sizes and weights contemplated in constructing the aircraft 10, such an aircraft has been constructed having a diameter of approximately 22 feet, a thickness of approximately 4 feet with a weight of approximately 160 pounds. By filling the envelope 12 with helium an offsetting buoyancy of about 70 pounds is achieved, thereby producing a resultant weight of approximately 90 pounds. This includes a 72 horsepower high r.p.m. gasoline engine 27, thereby producing a highly respectable horsepower to weight ratio. The exact ratio will depend on the weight of the operator 9 which is not included in the aforementioned resultant aircraft weight of 90 pounds. This example of a particular aircraft 10 is intended as illustrative and is in no way to be interpreted as a limitation of the scope of this invention.

An accessory item for using aircraft 10 over bodies of water is shown in FIGURE 3 and includes in inflatable ring 55 mounted on the bottom of compartment 11. A compressed air tank 56 is mounted in compartment 11 and may be actuated to inflate ring 55. Ring 55 is of a sufficient volumetric capacity to buoyantly support the craft 10 on water.

Referring now to FIGURE 6 a modified embodiment of this invention is shown comprising the aircraft 10a. The aircraft 10a includes a central compartment area similar or identical to the aforementioned compartment 11 but the outwardly extending envelope 12a is comprised solely of an unsupported inflatable member 60. Envelope 12a omits the aforedescribed superstructure 50 thereby making the envelope relatively flexible. The envelope is filled with a lighter-than-air gas to add the desired buoyant affect. This embodiment produces a particularly safe aircraft in that the operators compartment is effectively surrounded by a large inflated bumper for protection against collision with stationary or other moving objects.

Figure 7:
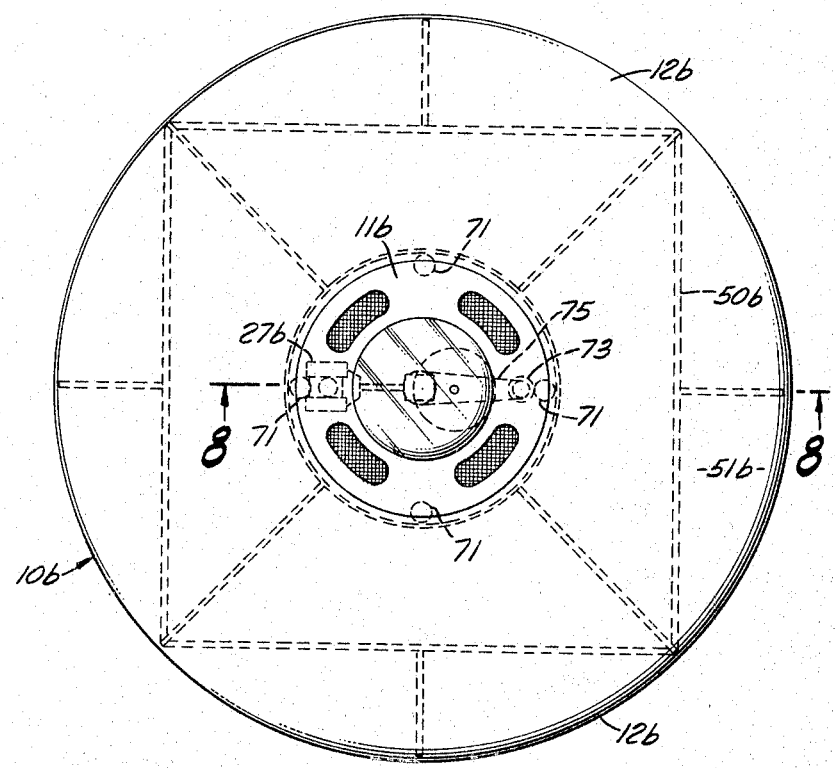
FIGURE 7 is a top plan view similar to FIGURE 1 and illustrating a further modified embodiment of the airship of this invention.
Figure 8:
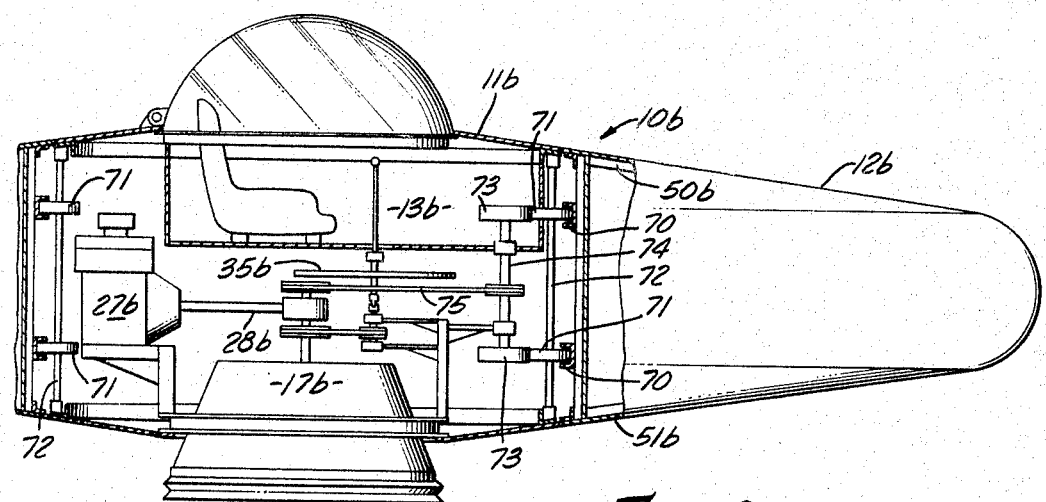
FIGURE 8 is a fragmentary section elevation view taken substantially on the line 8—8 in FIGURE 7.

Referring now to FIGURES 7 and 8, a further embodiment of the aircraft, generally designated 10b is shown. The central compartment 11b is substantially similar to the afore-described compartment 11 including an operator's section 13b, a truncated downwardly facing cone 17b for containing the fan (not shown) and an engine 27b for rotating the fan and the gyroscope wheel 35b. The envelope 12b is annular in shape and structurally independent of the compartment 11b. The envelope 12b includes a superstructure 50b covered with an imperforate skin 51b similar to the afore-described construction of envelope 12. A pair of annular tracks 70 are vertically spaced and mounted on the interior periphery of envelope 12b. A plurality of wheels 71 mounted on vertical shafts 72 engage the tracks 70 at circumferentially spaced locations. The shafts 72 are rotatably mounted on the compartment 11b, whereby the envelope 12b is rotatable on a vertical axis about the compartment 11b. A driving mechanism is employed for causing rotation of envelope 12b around compartment 11b and may be comprised of rollers 73 mounted on a shaft 74 and engaging a pair of the wheels 71. Shaft 74 is rotated by a V-belt drive 75 through the drive mechanism 28b from the engine 27b. Rotation of envelope 12b about compartment 11b produces a further stabilizing gyroscope affect. Further, as the aircraft 10b moves through the air this rotation causes a continual change in the portion of the skin 51b of the envelope 12b which is directly confronted by the air thereby minimizing the heat built-up that might otherwise be produced when the aircraft is moved at high rates of speed through the air.

Having fully described my invention it is to be understood that I do not wish to be limited to the specific details herein set forth or shown in the drawings, but rather my invention is of the full scope of the appended claims.

I claim:
1. In an aircraft, the combination of; a compartment, a downwardly facing fan mounted in the compartment, means for rotating said fan for drawing air from above the compartment, and forcing such air out the bottom of the compartment to produce an upward thrust on the aircraft, gyroscope means operably mounted in said compartment for stabilizing said compartment and having means for selectively changing the attitude of said gyroscopic means for selectively causing tilting of said compartment, and an inflated envelope encircling said compartment in the horizontal plane and mounted thereon.

2. In an aircraft, the combination of; a compartment, a power-driven fan rotatably mounted in the compartment for drawing air from above the compartment, and forcing air out the bottom of the compartment to produce an upward thrust on the aircraft, means for selectively causing tilting of said compartment, an inflated envelope mounted on said compartment and encircling said compartment in the horizontal plane, said envelope having a relatively flat circular shape with said compartment at the center and tapering upper and lower surfaces converging outwardly into a bluntly rounded circular periphery, and a gas of less density than air filling said envelope for buoyantly supporting a portion of the aircraft weight.

3. In an aircraft, the combination of; a compartment, a downwardly facing fan rotatably mounted in the compartment, means for rotating said fan for drawing air from above the compartment and forcing such air out the bottom of the compartment to produce an upward thrust on the aircraft, means for partially directing such air in a horizontal direction without tilting the compartment to urge the aircraft in the opposite horizontal direction, means for selectively causing tilting of said compartment, and an inflated envelope horizontally encircling and mounted on said compartment, said envelope having a relatively flat circular shape with said compartment at the center and forming a wedge shaped airfoil.

4. In an aircraft, the combination of; a compartment, a downwardly facing fan mounted in the compartment, means for rotating said fan for drawing air from above the compartment and forcing such air out the bottom of the compartment to produce an upward thrust on the aircraft, means for selectively causing tilting of said compartment, an envelope horizontally encircling and movably mounted on said compartment, said envelope having a relatively flat circular shape with said compartment at the center and tapering lower and upper surfaces converging outwardly and means for rotating the envelope relative to said compartment.

5. In a universally maneuverable aircraft operable by an occupant thereof, the combination of; a lightweight central compartment frame for accommodating the occupant, a downwardly facing and open truncated cone movably mounted in said compartment frame, a power-driven air fan rotatably mounted in said cone on a substantially vertical axis for drawing air through said compartment frame and discharging that air downwardly out said cone for producing a resultant upward thrust on said frame, means operable by the occupant for changing the position of said cone to direct the discharged air angularly of the vertical direction and produce a resultant component of force in a desired horizontal direction, means operable by the occupant for selectively causing tilting of said compartment frame, an inflated envelope mounted on and encircling said compartment frame and extending outwardly in a generally horizontal direction, and a gas having a density less than air filling said envelope for providing a buoyant lift force on the aircraft of an amount less than the total weight of the aircraft.

6. In a universally maneuverable aircraft operable by an occupant thereof, the combination of; a lightweight central compartment frame having upper and lower portions, said upper portion having means for accommodating the occupant, a downwardly facing and open truncated cone movably mounted in said lower portion, passageway means in said compartment frame communicating the said cone with the atmosphere above said compartment frame, a power-driven air fan rotatably mounted in said cone on a substantially vertical axis for drawing air through said passageway means and discharging that air downwardly out said cone for producing a resultant upward thrust on said frame, means operable by the occupant for changing the position of said cone to direct the discharged air angularly of the vertical direction and produce a resultant component of force in a desired horizontal direction, means operable by the occupant for causing tilting of said compartment frame, and an inflated envelope mounted on and encircling said compartment frame and extending outwardly in a generally horizontal direction.

7. In a universally maneuverable aircraft operable by an occupant thereof, the combination of; a central compartment frame for accommodating the occupant, a power-driven air fan rotatably mounted in said compartment frame for discharging air downwardly and producing a resultant upward thrust on said frame, a large diameter wheel of substantial weight relative to the weight of the aircraft mounted in said compartment frame for rotation on a given axis, means for rotating said wheel at a substantial speed for producing a gyroscopic effect, means operable by the occupant for tilting said wheel from said axis to produce a resultant force directly causing tilting of said compartment frame, and an inflated envelope mounted on and encircling said compartment frame and extending outwardly in a generally horizontal direction.

8. In a universally maneuverable aircraft operable by an occupant thereof, the combination of; a lightweight central compartment frame for accommodating the occupant, a power-driven air fan rotatably mounted in said compartment frame for discharging air downwardly and producing a resultant upward thrust on said frame, a large diameter wheel of substantial weight relative to the weight of the aircraft mounted in said compartment frame for rotation on a generally vertical axis, means for rotating said wheel at a substantial speed for producing a gyroscopic effect, means operable by the occupant for selectively tilting said wheel from said vertical axis to produce a resultant force directly causing tilting of said compartment frame, an inflated envelope mounted on and encircling said compartment frame and extending outwardly in a generally horizontal direction, said envelope having a circular outer periphery and being uniformly tapered from said compartment frame to said outer periphery, and a gas having a density less than air filling said envelope for providing a buoyant lift force on the aircraft of an amount less than the total weight of the aircraft.

9. In a universally maneuverable aircraft operable by an occupant thereof, the combination of; a lightweight central compartment frame having means for accommodating the occupant, a downwardly facing and open truncated cone mounted in said compartment frame, passageway means in said compartment frame communicating the said cone with the atmosphere above said compartment frame, a power-driven air fan rotatably mounted in said cone on a substantially vertical axis for drawing air through said passageway means and discharging that air downwardly out said cone for producing a resultant upward thrust on said frame, extensible and collapsible annular means mounted on the periphery of the lower extremity of said cone for sealably engaging a ground surface during the initial upward movement of said frame, means operable by the occupant for causing tilting of said compartment frame, an inflated envelope mounted on and encircling said compartment frame and extending outwardly in a generally horizontal direction, and a gas having a density less than air filling said envelope for providing a buoyant lift force on the aircraft of an amount less than the total weight of the aircraft.

10. In a universally maneuverable aircraft operable by an occupant thereof, the combination of; a lightweight central compartment frame having upper and lower portions, said upper portion having means for accommodating the occupant, a downwardly facing and open truncated cone movably mounted in said lower portion, passageway means in said compartment frame communicating the said cone with the atmosphere above said compartment frame, a power-driven air fan rotatably mounted in said cone on a substantially vertical axis for drawing air through said passageway means and discharging that air downwardly out said cone for producing a resultant upward thrust on said frame, means operable by the occupant for changing the position of said cone to direct the discharged air angularly of the vertical direction and produce a resultant component of force in a desired horizontal direction, a large diameter wheel of substantial weight relative to the weight of the aircraft mounted in said compartment frame for rotation on a generally vertical axis, means for rotating said wheel at a substantial speed for producing a gyroscopic effect, means operable by the occupant for tilting said wheel from said vertical axis to produce a resultant force causing tilting of said compartment frame, an inflated envelope mounted on and encircling said compartment frame and extending outwardly in a generally horizontal direction, said envelope having a circular outer periphery and being uniformly tapered from said compartment frame to said outer periphery, and a gas having a density less than air filling said envelope for providing a buoyant lift force on the aircraft of an amount less than the total weight of the aircraft.

11. In a universally maneuverable aircraft operable by an occupant thereof, the combination of; a lightweight central compartment frame having upper and lower portions, said upper portion having means for accommodating the occupant, a downwardly facing and open truncated cone movably mounted in said lower portion, passageway means in said compartment frame communicating the said cone with the atmosphere above said compartment frame, a power-driven air fan rotatably mounted in said cone on a substantially vertical axis for drawing air through said passageway means and discharging that air downwardly out said cone for producing a resultant upward thrust on said frame, means operable by the occupant for changing the position of said cone to direct the discharged air angularly of the vertical direction and produce a resultant component of force in a desired horizontal direction, extensible and collapsible annular means mounted on the periphery of the lower extremity of said cone for sealably engaging a ground surface through the initial upward movement of said frame, a large diameter wheel of substantial weight relative to the weight of the aircraft mounted in said compartment frame for rotation on a generally vertical axis, means for rotating said wheel at a substantial speed for producing a gyroscopic effect, means operable by the occupant for tilting said wheel from said vertical axis to produce a resultant force causing tilting of said compartment frame, an inflated envelope mounted on and encircling said compartment frame and extending outwardly in a generally horizontal direction, said envelope having a circular outer periphery and being uniformly tapered from said compartment frame to said outer periphery, and a gas having a density less than air filling said envelope for providing a buoyant lift force on the aircraft of an amount less than the total weight of the aircraft.

12. In a universally maneuverable aircraft operable by an occupant thereof, the combination of; a central compartment frame having means for accommodating the occupant, a downwardly facing and power-driven air fan rotatably mounted in said compartment frame on a substantially vertical axis for drawing air through said compartment frame and discharging that air downwardly for producing a resultant upward thrust on said frame, a large diameter wheel of substantial weight relative to the weight of the aircraft mounted in said compartment frame for rotation on generally vertical axis, means for rotating said wheel at a substantial speed for producing a gyroscopic effect, means operable by the occupant for tilting said wheel from said vertical axis to produce a resultant force causing tilting of said compartment frame, an envelope rotatably mounted on and encircling said compartment frame and extending outwardly in a generally horizontal direction, said envelope having a circular outer periphery and being uniformly tapered from said compartment frame to said outer periphery, and means for rotating said envelope relative to said compartment frame.

References Cited by the Examiner
UNITED STATES PATENTS

| | | | |
|---|---|---|---|
| 995,819 | 6/1911 | Walker | 244—79 |
| 3,054,578 | 9/1962 | Brocard | 244—23 |
| 3,083,934 | 4/1963 | Vanderlip | 244—5 |

MILTON BUCHLER, *Primary Examiner.*

ALFRED E. CORRIGAN, *Examiner.*